(12) United States Patent
Terayama et al.

(10) Patent No.: US 9,432,256 B2
(45) Date of Patent: Aug. 30, 2016

(54) RESOURCE MANAGEMENT METHOD AND RESOURCE MANAGEMENT SYSTEM

(71) Applicant: Hitachi, Ltd., Tokyo (JP)

(72) Inventors: Atsumi Terayama, Tokyo (JP); Toshio Otani, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/425,525

(22) PCT Filed: Mar. 27, 2014

(86) PCT No.: PCT/JP2014/058866
§ 371 (c)(1),
(2) Date: Mar. 3, 2015

(87) PCT Pub. No.: WO2015/145664
PCT Pub. Date: Oct. 1, 2015

(65) Prior Publication Data
US 2015/0350019 A1  Dec. 3, 2015

(51) Int. Cl.
*H04L 12/24* (2006.01)
*G06F 11/34* (2006.01)
*H04L 12/911* (2013.01)
*H04L 12/26* (2006.01)
(Continued)

(52) U.S. Cl.
CPC .............. *H04L 41/0816* (2013.01); *G06F 9/50* (2013.01); *G06F 11/3003* (2013.01); *G06F 11/3031* (2013.01); *G06F 11/34* (2013.01); *G06F 11/3433* (2013.01); *G06F 11/3442* (2013.01); *G06F 11/3466* (2013.01); *H04L 43/0888* (2013.01); *H04L 47/783* (2013.01); *G06F 2201/81* (2013.01); *G06F 2201/815* (2013.01); *G06F 2201/865* (2013.01)

(58) Field of Classification Search
CPC . G06F 11/3409; G06F 3/0653; G06F 3/0689; G06F 11/0793; G06F 9/50; G06F 11/34; G06F 2201/87; H04L 67/1097; H04L 41/0873; H04L 41/5009; H04L 47/822; Y02B 60/142; H04W 28/08; H04W 28/20
See application file for complete search history.

(56) References Cited

U.S. PATENT DOCUMENTS 6,457,143 B1 * 9/2002 Yue .................... H04L 12/2697
709/223
6,704,721 B1 * 3/2004 Hellerstein ....... G06F 17/30595
(Continued)

FOREIGN PATENT DOCUMENTS

| JP | 2012-208541 A | 10/2012 |
| WO | 2010/032701 A1 | 3/2010 |
| WO | 2011/155233 A | 12/2011 |

*Primary Examiner* — Sargon Nano
(74) *Attorney, Agent, or Firm* — Volpe and Koenig, P.C.

(57) ABSTRACT

In a cloud environment where multiple applications having different performance characteristics are operated in a mixture, in order to specify the cause of performance deterioration and to solve the confliction of requests related to a shared resource, the present invention detects the performance deterioration of resources allocated to multiple instances constituting a logical server configuration, and extracts an instance sharing resources existing performance deterioration, and compares a performance tendency of the extracted instance and a performance pattern showing a characteristics extracted from a performance information of the resource in association with a bottleneck factor, to thereby estimate the bottleneck factor by calculating mutual similarities and determining a performance pattern where the calculated similarity becomes maximum.

6 Claims, 11 Drawing Sheets

(51) Int. Cl.
*G06F 9/50* (2006.01)
*G06F 11/30* (2006.01)

(56) References Cited

U.S. PATENT DOCUMENTS

| | | | | |
|---|---|---|---|---|
| 6,785,889 B1* | 8/2004 | Williams | G06F 9/50 | 709/229 |
| 7,903,571 B1* | 3/2011 | Herington | H04L 67/1002 | 370/252 |
| 7,990,913 B2* | 8/2011 | Massiera | H04L 12/5695 | 370/328 |
| 8,549,528 B2* | 10/2013 | Nakajima | G06F 3/061 | 718/104 |
| 2004/0059877 A1* | 3/2004 | Brown | G06F 12/0811 | 711/144 |
| 2004/0143664 A1 | 7/2004 | Usa et al. | | |
| 2004/0215939 A1* | 10/2004 | Armstrong | G06F 9/30181 | 712/220 |
| 2005/0268148 A1* | 12/2005 | Matsubara | G06F 11/0709 | 714/2 |
| 2006/0140119 A1* | 6/2006 | Yeh | H04L 49/254 | 370/235 |
| 2008/0240150 A1* | 10/2008 | Dias | H04L 12/5695 | 370/465 |
| 2009/0235269 A1* | 9/2009 | Nakajima | G06F 3/061 | 718/104 |
| 2010/0191854 A1* | 7/2010 | Isci | G06F 1/3203 | 709/226 |
| 2011/0161743 A1* | 6/2011 | Kato | G06F 11/0709 | 714/47.2 |
| 2012/0042312 A1* | 2/2012 | Isci | G06F 1/3203 | 718/1 |
| 2012/0159428 A1* | 6/2012 | Park | G06F 8/36 | 717/104 |
| 2014/0013071 A1* | 1/2014 | Nakajima | G06F 3/061 | 711/170 |
| 2014/0019415 A1* | 1/2014 | Barker | G06F 17/303 | 707/643 |
| 2014/0310473 A1* | 10/2014 | Bilas | G06F 11/00 | 711/129 |

* cited by examiner

INSTANCE MANAGEMENT TABLE

| INSTANCE | OWNER | RESOURCE POOL | VIRTUAL RESOURCE CONFIGURATION | NETWORK POLICY | GRADE | CONSUMPTION POINT | USE DUE DATE | APPLICATION MANAGEMENT SERVER |
|---|---|---|---|---|---|---|---|---|
| IST-A0-0001 | User #01-023 | RP-A3 | CPU:3.0GHz x8CORE MEMORY:18GB DISK:500GB... | NWP-001 | Gold | 650pt | 30 DAYS LEFT | APP2 |
| IST-A0-0003 | User #01-023 | RP-A3 | CPU:1.8GHz x2CORE MEMORY:2GB DISK:64GB... | NWP-001 | Bronze | 200pt | 90 DAYS LEFT | - |
| IST-A0-0004 | User #01-008 | RP-A3 | CPU:2.1GHz x4CORE MEMORY:12GB DISK:120GB... | NWP-008 | Silver | 400pt | 60 DAYS LEFT | APP10 |
| IST-A0-0006 | User #01-023 | RP-CB | CPU:3.0GHz x8CORE MEMORY:32GB DISK:640GB... | NWP-008 | Platinum | 750pt | 30 DAYS LEFT | APP2 |
| IST-A0-B201 | User #01-010 | RP-A2 | CPU:2.8GHz x8CORE MEMORY:18GB DISK:480GB... | NWP-001 | Gold | 500pt | 30 DAYS LEFT | - |
| ... | ... | ... | ... | ... | ... | ... | ... | ... |

Fig. 6

RESOURCE CONFIGURATION MANAGEMENT TABLE

| RESOURCE POOL | ACCESS RIGHT | PHYSICAL SERVER | ETHER SWITCH | FC SWITCH | STORAGE SUBSYSTEM |
|---|---|---|---|---|---|
| RP-A2 | ACL-01A9 | SVR-0011 | INW-2011 | SNW-A7 | STR-0000, STR-0002 |
| RP-A3 | ACL-01A9 | SVR-0012, SVR-0701, SVR-0702 | INW-0C50, INW-0C51, INW-0C53 | SNW-A7, SNW-B7 | STR-03C0 |
| RP-CB | ACL-0007 | SVR-8201 | INW-0020 | SNW-A8 | STR-0010, STR-03C2 |
| RP-CC | ACL-0007 | SVR-0013, SVR-8299 | INW-04A0, INW-04A1 | SNW-A9, SNW-AA | STR-0020 |
| ⋮ | ⋮ | ⋮ | ⋮ | ⋮ | ⋮ |

Fig. 7

CONFIGURATION CHANGE MEANS MANAGEMENT TABLE 214

| ID 214a | CONFIGU-RATION CHANGE MEANS 214b | PERFORMANCE DETERIORATION FACTOR 214c | STEP ID 214d | EXECUTION STEP 214e | PRECONDITION 214f | POSTCONDITION 214g | REQUEST DESTINATION 214h | PERFORMANCE PATTERN ACQUISITION KEY 214j |
|---|---|---|---|---|---|---|---|---|
| M-001 | MIGRATE VIRTUAL DISK | LACK OF DISK IO BAND, DRIVE NECK, LACK OF DISK CAPACITY | step1 | SELECT MIGRATION DESTINATION VOLUME | [free capacity] > [required capacity] | if ([dest]!="null") then skip step2 | SERVER MANAGEMENT UNIT | PP-1211 |
| | | | step2 | CREATE MIGRATION DESTINATION VOLUME | [free capacity] > [required capacity] | | STORAGE MANAGEMENT UNIT | PP-8A90 |
| | | | step3 | FREEZE APPLICATION | | [app status]=="fixed" | APPLICATION MANAGEMENT SERVER "APP2" | PP-0330 |
| | | | step4 | MIGRATE DISK AREA | | | SERVER MANAGEMENT UNIT | PP-C2DD |
| | | | step5 | DELETE MIGRATION SOURCE VOLUME | [is used]=="false" | | STORAGE MANAGEMENT UNIT | PP-BEFF |
| M-002 | EXPAND STORAGE POOL | DRIVE NECK, LACK OF DISK CAPACITY | step1 | SELECT ADDITIONAL VOLUME | [max config] > [required capacity] | if ([dest]!="null") then skip step2 | STORAGE MANAGEMENT UNIT | PP-1214 |
| | | | step2 | CREATE ADDITIONAL VOLUME | [free capacity] > [required capacity] | | STORAGE MANAGEMENT UNIT | PP-4203 |
| | | | step3 | EXPAND POOL | [pool status]=="ready" | [pool status]=="ready" | STORAGE MANAGEMENT UNIT | PP-F200 |
| ... | ... | ... | | | | ... | | |

Fig. 8

JOB MANAGEMENT TABLE

| ID | JOB | ISSUE TARGET | START TIME |
|---|---|---|---|
| 12-0C00 | DEPLOY PLAN | Host 01, Storage 01 | 14:00 |
| 12-0C01 | [M-001] MIGRATE VIRTUAL DISK | Host 01 | 14:20 |
| 12-0C01 | CONFIRM OS UPDATE | Host E9 | 21:00 |
| 12-0C01 | REGULAR BACKUP | Storage B2 | 22:00 |
| ... | ... | ... | ... |

Fig. 9

TOPOLOGY MANAGEMENT TABLE 216

| INSTANCE | RESOURCE POOL | PHYSICAL SERVER | | | ETHER SWITCH | FC SWITCH | STORAGE SYSTEM | | | |
|---|---|---|---|---|---|---|---|---|---|---|
| | | ID | CPU CORE | NIC | | | ID | PORT | CACHE | VOLUME | RAID GROUP |
| IST-A0-0001 | RP-A3 | SVR-0701 | Core 0-7 | #0 | [INW-0C50]:1 | [SNW-A7]:02:H, [SNW-A7]:15:S, [SNW-B7]:05:H, [SNW-B7]:20:S | STR-03C0 | P2, P3 | CPR#1 | VOL#11 | RG201 |
| IST-A0-0003 | RP-A3 | SVR-0701 | Core 3-4 | #1 | [INW-0C51]:1 | [SNW-A7]:03:H, [SNW-A7]:06:S | STR-03C0 | P4 | CPR#2 | VOL#12 | RG201 |
| IST-A0-0004 | RP-A3 | SVR-0702 | Core 8-12 | #0, #1 | [INW-0C53]:1, [INW-0C53]:2 | [SNW-B7]:06:H, [SNW-B7]:20:S | STR-03C0 | P3 | CPR#1 | | RG201 |
| ... | | | | | ... | ... | | | | | |

RESOURCE MANAGEMENT METHOD AND RESOURCE MANAGEMENT SYSTEM

TECHNICAL FIELD

The present invention relates to a method and a system for managing configuration of resources in computers.

BACKGROUND ART

Recently, information processing system bases are spreading widely, which utilize virtualization techniques such as server virtualization and storage virtualization to integrate multiple business systems in the resources of a physical computer, to thereby enhance the efficiency of use of resources of the whole data center. The systems which had been operated in a fixed manner in resources are isolated from the physical resources via virtualization, and migrated over physical resources according to the status of operation of the business applications, so that workloads can be dynamically balanced.

Especially, according to a computer system called an IaaS (Infrastructure as a Service) cloud, where a self-service portal is adopted, a user is capable of provisioning a desirable application to the respective virtual servers, or is capable of changing the configuration of the virtual server according to their demands, without concerning the administrator.

On the other hand, as a result of enhancing the consolidation ratio through virtualization technique, the business systems that are logically used by different users often have unintentional impact on performances. Multiple applications can be configured to share a single physical resource due to the virtualization technique, but on the other hand, the capacity, bandwidth or processing performance of the physical resource is restricted physically, so that excessive load may cause a bottleneck of the performance.

In order to eliminate such instability of performance, for example, a countermeasure is taken to allocate physical resources with higher priority to sections causing bottleneck. For example, according to Patent Literature 1, a technique is disclosed to search other virtual servers having similar states of use of resources with respect to a virtual server having added resources thereto, and to perform adjustment so that the resource will not become the bottleneck by applying an operation to add the same type of resource.

From the viewpoint of the provider side of the cloud service, confronting requests exist, to consolidate as much business systems as possible to a smaller number of physical resources in order to improve the efficiency of use thereof, and at the same time, to allocate enough resources exclusively to stabilize the performance.

Therefore, in an environment utilizing the virtualization technique, the problem to be solved is the coexistence of use efficiency versus performance stability. For example, Patent Literature 2 discloses an art of allocating only necessary amount of resources to business applications by determining the amount of resources to be added based on a performance prediction, to thereby improve the overall system's use efficiency.

CITATION LIST

Patent Literature

[PTL 1] U.S. Patent Application Publication No. 2004/0143664
[PTL 2] International Patent Publication No. WO2011/155233

SUMMARY OF INVENTION

Technical Problem

In a cloud environment where multiple applications having different performance characteristics are operated in a mixture, the factors that influence the performance differ according to the tendency of consumption of resources by independent applications differ, so that if the method for evaluating the performance load does not correspond to those performance characteristics, the factor of performance deterioration cannot be specified appropriately.

Further, the change operation of configuration itself for enhancing the performance causes processing load to occur, so that if the factor of deterioration of performance is erroneously determined, the concentration of processing load further causes overlap of processing load caused by change of configuration to the portion where performance deterioration has already occurred, so that the deterioration of performance is progressed even further.

Solution to Problem

According to the above-described cloud environment, with respect to multiple instances constituting the logical server configuration, the deterioration of performance of resources allocated to the instances is detected, and the instances sharing the resource exhibiting performance deterioration are extracted. The tendency of performance of the extracted instance and the performance pattern showing the characteristics extracted from the performance information of the resource in association with the bottleneck factor are compared, the similarities thereof are calculated, and based on the performance pattern where the similarity becomes maximum, the bottleneck factor is estimated.

Advantageous Effects of Invention

According to the present invention, in a cloud environment where multiple applications having different performance characteristics are operated in a mixture, the performance tendency of instances sharing the resource exhibiting performance deterioration and the performance pattern of resources are compared, and based on the performance pattern where the similarities become greatest, the bottleneck factor is estimated, so as to exert an effect of enhancing the accuracy for specifying the factor of performance deterioration.

BRIEF DESCRIPTION OF DRAWINGS

FIG. 6 is a view illustrating an instance management table according to the preferred embodiment.

FIG. 7 is a view illustrating a resource configuration management table according to the preferred embodiment.

FIG. 8 is a view showing a configuration change means management table according to the present embodiment.

FIG. 9 is a view illustrating a job management table according to the present embodiment.

FIG. 10 is a view illustrating a topology management table according to the present embodiment.

DESCRIPTION OF EMBODIMENTS

The present invention provides a resource management method and system for specifying a fluctuation factor of performance caused by the processing loads of multiple business applications, and for performing appropriate resource allocation.

Embodiment

<System Configuration>

Figure 1:
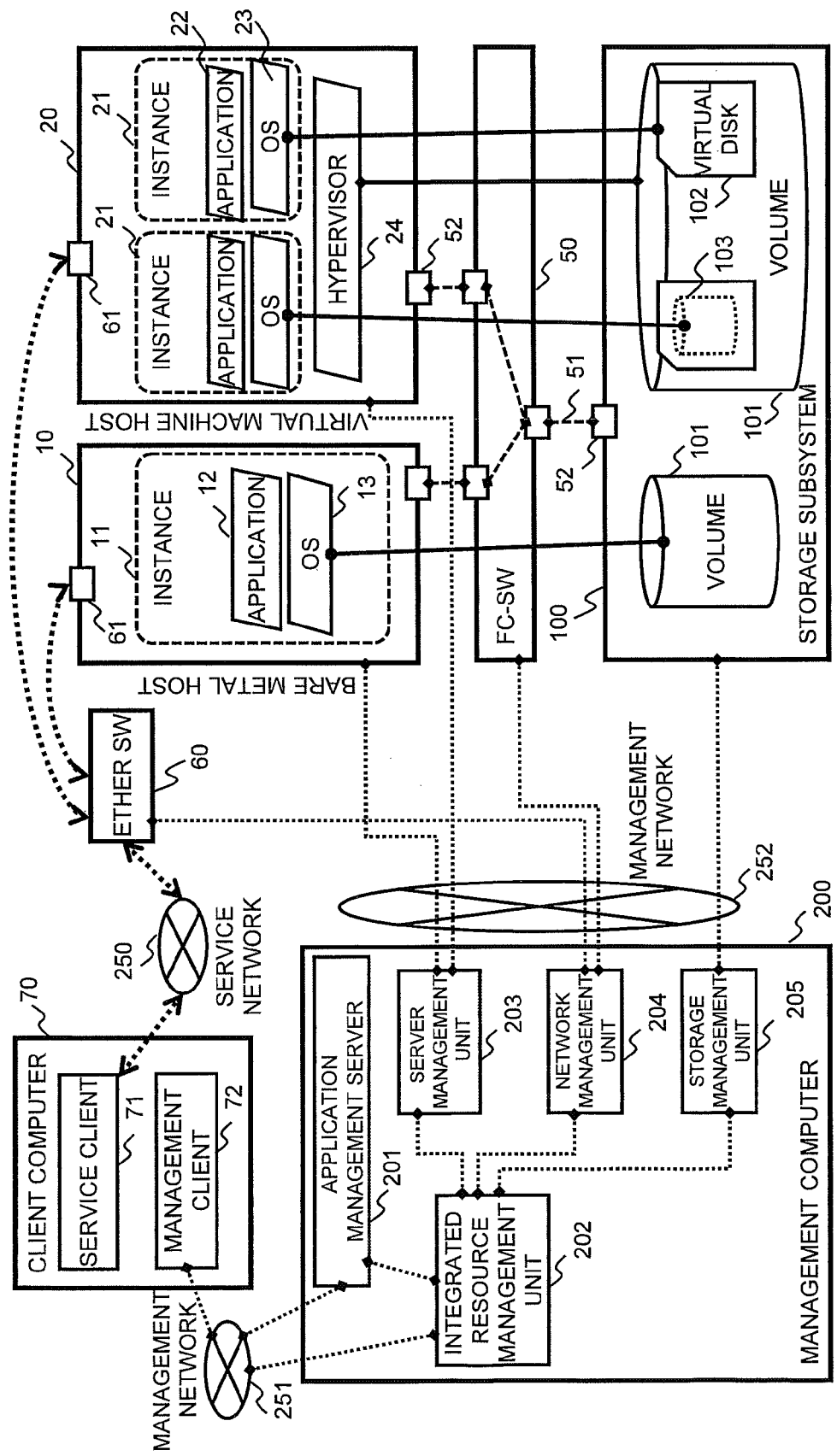
FIG. 1 is a system configuration diagram according to a preferred embodiment of the present invention.

FIG. 1 is a configuration diagram of a computer system according to a preferred embodiment of the present invention.

The present computer system is composed of physical servers 10 and 20 for operating an information processing service, a storage system 100 for storing necessary data, a client computer 70 used by a user requesting services, a management computer 200 managing the system, and multiple networks mutually connecting the same.

The physical server 10 is composed of a general computer architecture, such as a physical CPU (Central Processing Unit) and memory (main memory), an input-output device, a network interface, and an internal bus mutually connecting the same.

In the present system, a logical configuration of the host 10 can be controlled directly by an OS (Operating System) 13 for directly controlling physical resources operating in the physical server 10, and by having an administrator of the application or a user utilize the same as a guest OS.

As described, in an arrangement where a guest OS 13 directly controls the configuration of all resources of the physical server 10, the server is called a bare metal host 10. Further, a logical server configuration controlled by the guest OS 13 is called an instance 11, wherein one or more applications 12 are operated to enable the user to enjoy the desired information processing services.

Applications provide information processing functions such as a Web server or a database, and by combining the functions in response to conditions, a business system that the user uses can be configured.

On the other hand, a physical server 20 has a similar configuration as the physical server 10, wherein physical resources are logically divided into one or more guest OS areas via a hypervisor 24 or a virtualization software called a virtual machine monitor, and provided to the administrator of the application or the user.

As described, the dividing of physical resources into one or more parts and providing the same as logical partitions is called allocation of resources. Further, these OS areas are generally called a virtual machine or a logical partition, and the physical server 20 is called a virtual machine host. These guest OS areas can be handled as a virtual machine sharing physical components such as the CPU core via time scheduling, or can be handled as a logical partition to which physical components are mapped in a fixed manner, using the method of the virtualization software. Hereafter, the above-mentioned difference will not be distinguished so as to simplify the description, and the areas will be simply referred to as a virtual machine.

A guest OS 23 operates within the virtual machine, and an application 22 used by the user is further operated therein. The virtual machine corresponds to a single logical server configuration, and similar to the case of the bare metal host, this machine is called an instance 21.

As described above, according to the present computer system, a physical server and a storage having similar configurations are used both as a bare metal host and a virtual machine host. Generally, in many systems that create an instance dynamically based on a creation request from a user, such as a system called an IaaS cloud, a virtual machine is used.

A physical server changes the resource allocation quantity through increase and decrease of physical components, but in contrast, a virtual machine can change the allocation of resources provided by a physical server using a software. By utilizing the virtual machine, the instance configuration can be isolated from restrictions due to physical resource configurations of a physical server, so that a server configuration for operating applications can be generated flexibly and immediately, and the configuration change after generating the server can be facilitated.

On the other hand, since the virtual machine shares physical resources of the virtual machine host, it is inevitable that the performance thereof is influenced by other virtual machines. If the quantity of demands to applications operating in virtual machines is nearly balanced as a result of the combination of multiple virtual machines, the efficiency of resources usage can be improved, but if the processing demands are simultaneously increased for some virtual machines, the shared resources may become a bottleneck of the performance.

Such environment is not appropriate for applications having high performance requirements, such as in a database where stable disk I/O performance is required. According to the present invention, a bare metal host having a one-to-one correspondence with the physical server is utilized, to thereby provide a server environment with a stable performance. Furthermore, by providing an environment where both the virtual machine host and the bare metal host can be utilized, allocation methods of resources most suitable for the performance requirements or lifecycle of the application can be realized.

The storage system 100 according to the present embodiment provides storage resources to the respective instances 11 and 21. The storage system 100 specializes in data input and output processes, has a CPU and a memory similar to the physical servers 10 and 20, and operates control programs for controlling the configuration of the storage resources. By this control program, physical storage media such as HDDs (Hard Disk Drives) can be provided in units of logical areas called volumes 101.

For example, in a bare metal host 10, a volume 101 is recognized by the OS 13 as a storage resource (logical device), and reading and writing of data required by the OS 13 and the application 12 are performed. In a virtual machine host 20, the hypervisor 24 further divides the volume 101 into areas called virtual disks 102 (which, in many cases, are files in a file system). At this time, the data area within the virtual disk 102 is recognized as a virtual volume 103 by the OS 23 in the instance 21.

The physical servers 10 and 20 and the storage system 100 are connected via a SAN (Storage Area Network). One actual example of the SAN is an FC-SAN having one or more Fibre Channel switches (FC-SW) 50, a Fibre Channel cable 51, and an HBA (Host Bus Adapter) 52 for connecting the respective input and output devices.

The HBA is mounted to the physical servers 10 and 20 and the storage system 100, and is connected to other HBAs and FC-SW via a port disposed in the HBA. However, the mounting of the SAN is not restricted to using Fibre Channels, and for example, other types of devices and protocols, such as iSCSI, FCoE and Infini-band, can be used as long as they can implement large-capacity data communication.

The physical servers 10 and 20 providing services, the client computer 70 requesting services and the management computer 200 managing the computer system are mutually connected via a network. The respective computers are connected to the network via an NIC (Network Interface Controller). The network is physically connected via an Ethernet switch 60 and a cable, and enables mutual communication of application data and control information through use of protocols such as a TCP/IP.

According to the present embodiment, a network is further classified into a service network 250, and management networks 251 and 252. Traffic mainly caused by a service client 71 communicating with applications 12 and 22 is flown through the service network 250, and transmission and reception of data required for information processing services are performed.

On the other hand, in management networks 251 and 252, traffic mainly caused by a management client 72 and respective management servers communicating with control components of respective devices is flown therethrough, and transmission and reception of control data for managing the configurations of respective information processing devices are performed. These communication paths can be physically isolated, or composed of logical network isolation, such as by configuration of a layer-3 switch or a layer-2 switch (VLAN, virtual local area network) and so on.

The client computer 70 is physically composed of a general computer architecture such as a CPU, a memory and a persistent storage device, similar to various physical servers. This client computer 70 includes a service client 71, which is a software that receives provision of information processing services from applications in an instance, and a management client 72, which connects to the management computer 200 to handle the system configuration.

Further, the respective software in the client computer 70 are not necessary an application or a dedicated program for each management computer, and can be a general-purpose program, such as a Web browser, as long as it has a function to achieve the same object. Further, the service client 71 and the management client 72 can be introduced separately to multiple client computers 70, according to conditions such as the installation location or the user.

The management computer 200 changes the configuration of the computer system according to the requests from a user transmitted from the client computer 70. This management computer 200 has a general computer architecture, similar to other computers, and has management programs necessary to achieve the respective functions operated therein.

The management program(s) according to the present embodiment is a collective term referring to an application management server 201, an integrated resource management unit 202, a server management unit 203, a network management unit 204 and a storage management unit 205. Each management program can be further subdivided per function, or collectively mounted. Further, it is possible to have multiple management computers 200 cooperate to operate these management programs, or to have them arranged in a distributed manner to a portion of the management target, such as the instance 11 or an agent program in the FC-SW 50. Actually, the administrator uses these management programs to prepare multiple management programs based on the range of the devices being controlled and his/her responsibilities, and imply access policies related to the respective functions of the management program by account authentication.

The application management server 201 provides a function to manage the applications 12 and 22 in the instances 11 and 21. Generally, an application has unique data structures and functions and process flows suitably processed by the application, so that in order to manage the same, a proprietary application management server 201 becomes necessary. Further, if the application is a wide-spread application, the application administrator managing the application is familiar with the operation of the application management server having a unique management method and the management interface. A high user-friendliness can be achieved by the application administrator utilizing such know-how and co-operating the application management and resource configuration management. Furthermore, in an application where requests related to resource configuration such as performance requirements occur, the application management server may have a function for managing partial resource configurations.

Therefore, in the present embodiment, the application management server 201 and the integrated resource management unit 202 are configured to mutually communicate control information and to be able to change the configuration of the management target. One example of such cooperation can be realized by providing a plug-in to the application management server and an API (Application Programmable Interface) to the integrated resource management unit.

Further, such application management server 201 designates a specific resource as the management target, and has an authority to change the configuration thereof independently from other application management servers. Further, the hypervisor 24 can also be considered as one of applications that run on the physical server, and the hypervisor management server also cooperate with the integrated resource management unit 202 as one type of application management server 201.

The resource configuration of respective devices managed by the management computer 200 is managed by the integrated resource management unit 202 and the respective device management units. The respective device management units are a collective term of the server management unit 203, the network management unit 204 and the storage management unit 205, which manage the configuration of server devices such as the physical servers 10 and 20, network switches such as the FC-SW 50 and the Ether SW 60, and the storage system 100 via a management network 252.

In further detail, the respective device management units have a function to change the configuration of logical resources in the respective management target devices, to acquire and accumulate the operation information thereof, or to set respective attribute values. Further, the respective device management units are proprietary management programs provided by venders who develops and manufactures systems, but control information can be communicated using the integrated resource management unit 202 and management interfaces such as API.

The integrated resource management unit 202 controls the respective device management units according to the requests from the management client 72, and creates instances or changes the device configurations required for the configuration change. As described, the integrated resource management unit 202 implements a management method characteristic to the present invention, and actual configurations, functions and processing steps will be described in detail later.

Figure 2:
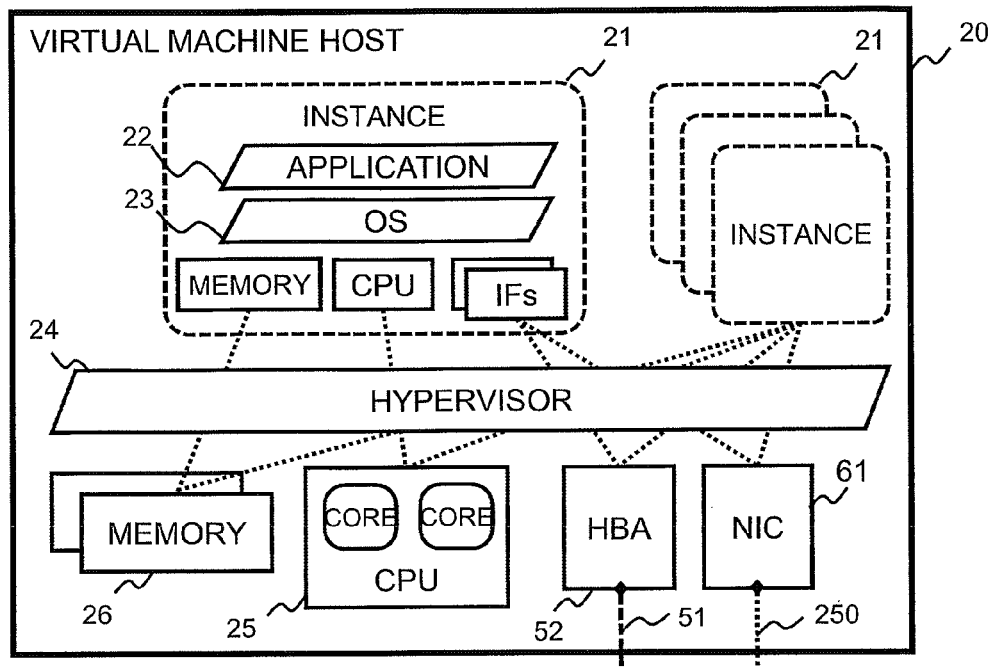
FIG. 2 is an internal configuration diagram of a virtual machine host according to the preferred embodiment.

FIG. 2 is an internal configuration diagram of the virtual machine host 20. As mentioned earlier, the hypervisor 24 allocates the physical resource configured on the physical server (virtual machine host 20) to the instance 21. The target physical resource can be, for example, a processing unit such as a multi-core CPU 25 and a memory 26, and an interface such as a HBA 52 and a NIC 61, and more precisely, the target physical resource is limited to that corresponding to the hypervisor 24. The resource allocated by the hypervisor 24 is recognized as a physical resource configured on a virtual server device from the OS 23 in the instance 21, so that it is not necessarily in a one-to-one correspondence with the physical resource, and it is generally called a virtual resource.

There are multiple methods for allocating virtual resources according to the configuration of the physical resource, which are all based on existing elemental technology. For example, in the case of a CPU, the physical CPU can be shared by multiple instances, such as by adopting a method where a specific core within the CPU is set to be used by a specific instance, or by adopting a method for scheduling the processing of multiple virtual CPUs by a single physical CPU in time series. In the case of a memory, there is a method where the range of addresses used by the instance is virtually defined, and the physical address range actually retaining the data is expanded or compressed according to the state of use of the instance. In the case of respective interfaces, there are a method where a specific port out of the multiple ports physically provided thereto is set to be used only by a specific instance, a method where a single port is time-shared by multiple instances, and a method where processing priorities are assigned to data packets in the interface and transfer bandwidths are logically divided.

Figure 3:
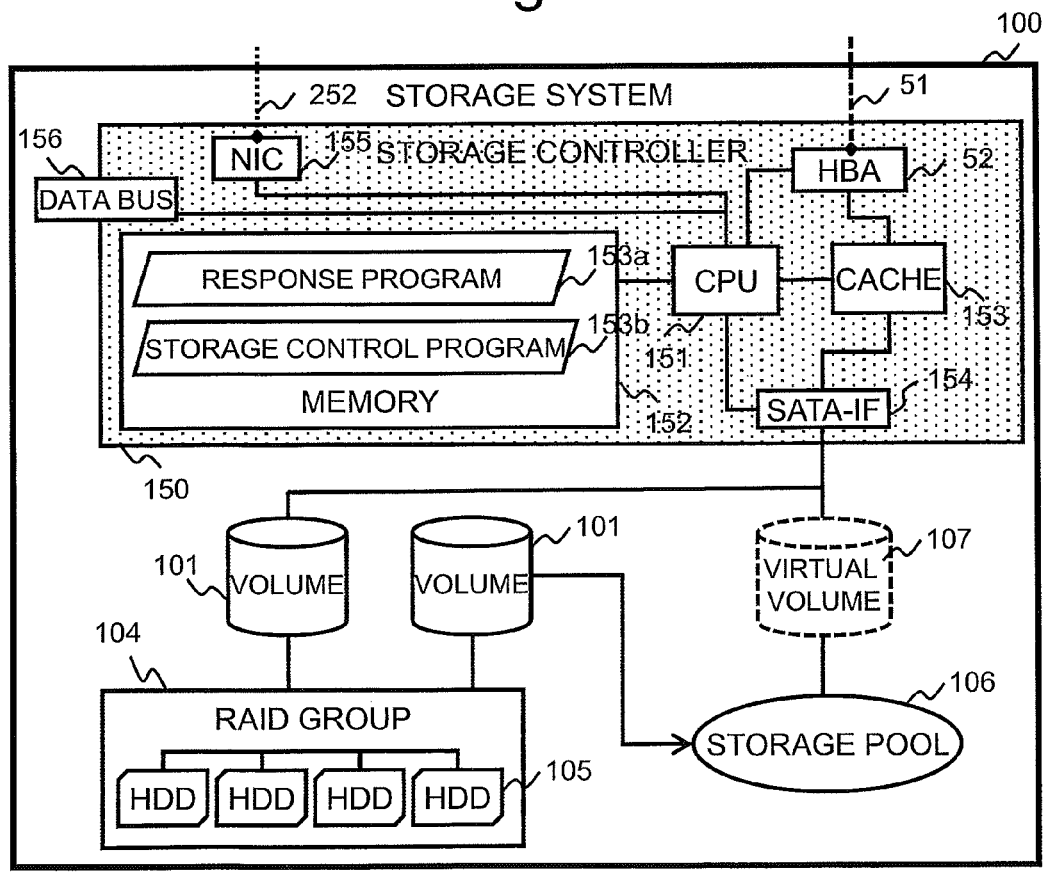
FIG. 3 is an internal configuration diagram of a storage subsystem according to the preferred embodiment of the present invention.

FIG. 3 is an internal configuration diagram of the storage system 100. As mentioned earlier, the storage system 100 has a function to provide storage resources for storing data to the respective instances 11 and 21. The storage system 100 is physically composed of one or more storage controllers 150 and one or more storage media 105, wherein based on the function of the storage controller 150, a logical configuration of the storage resources is constructed. The storage controller 150 has a general computer architecture, and provides a function specialized in controlling storage resources by a control programs group 153 that the CPU 151 has read into the memory 152.

In the present embodiment, this control programs group 153 at least includes a response program 153a for returning a response to a data read/write request from a server, and a storage control program 153b for controlling the aforementioned logical storage configuration. The data communication from the server to the storage resources is performed via a SAN 51 connected by the HBA 52. The communication from the storage management unit 205 to the storage controller 150 is performed via the management network 252 by the NIC 155.

Further, the CPU 151 realizes the functions of the storage controller 150 by utilizing a SATA-IF 154 for transmitting/receiving data to/from the storage media 105, and a cache 153 which is a temporal data area for performing high-speed response to the server. Especially, the cache 153 has a smaller capacity compared to the nonvolatile storage media 105, but by utilizing the characteristics of being able to read and write data extremely speedily, the percentage (cache hit rate) of data requested from the server existing in the cache 153 can be increased, by which the IO performance is enhanced.

The reading and writing of data from the cache 153 to the storage media 105, such as the calculation of parity value or Read Modify Write, causes processing load to be applied to the CPU 151. Such processing load varies according to the setting of the storage controller 150, such as the IO property, including the length of the IO (size of data being transferred by each IO command) or the ratio of sequential access, or the threshold of permissible dirty rate that influences the timing for accessing the HDD.

The storage control program 153b does not provide the storage media 105 in its raw form to the server, but defines a logical data structure therein and realizes efficient operation management of storage resources, so that it provides storage resources in units of volumes 101 to the server. Each volume 101 is defined as a data structure within a RAID (Redundant Arrays of Independent Disks) group 104 composed of multiple storage media devices (HDDs in the present example) 105.

However, there are mainly two types of methods for providing storage resources; one method is to provide defined volumes 101 directly from the RAID group to the server, and the other method is to temporarily assemble volumes to different configuration units called storage pools 106, and then providing the volumes 107 assigned from the storage pools 106 to the server. The latter method is for having the resource recognized as virtual defined volumes 107 from the viewpoint of the server, and to only have capacities where data are actually written via a storage capacity virtualization function from the storage pools 106.

When a single storage system 100 includes multiple storage controllers 150, the multiple storage controllers 150 cooperate via a data bus 156 connecting storage controllers 150, and operate so as not to cause any inconsistency to a single data area.

<Configuration Management Method>

Figure 4:
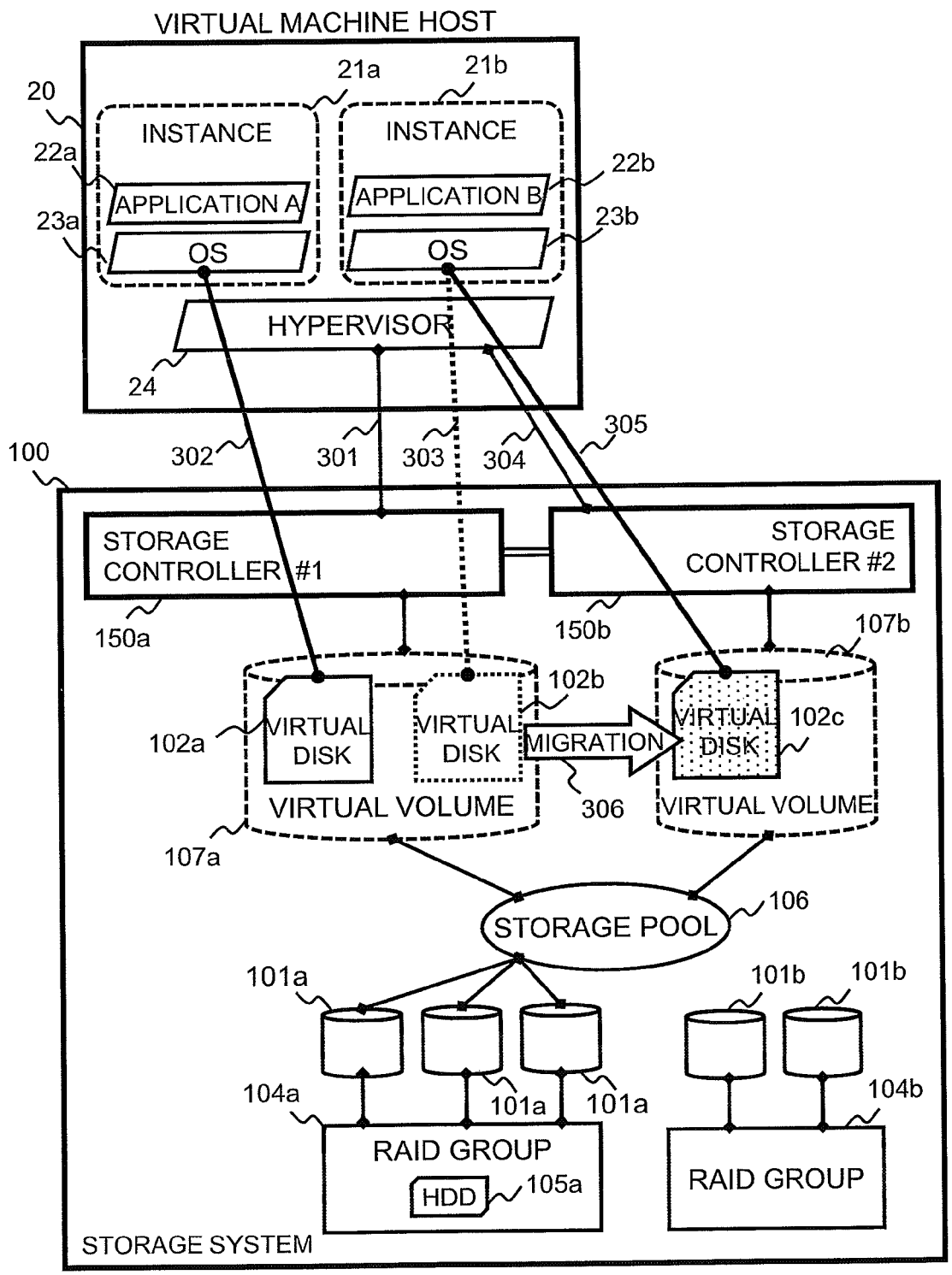
FIG. 4 is a conceptual diagram of a resource allocation method according to the preferred embodiment of the present invention.

FIG. 4 is a conceptual diagram of the method for allocating resources according to the present embodiment. In FIG. 4, two instances 21a and 21b are provisioned in one virtual machine host 20, and respective virtual disks 102a and 102b are accommodated in a virtual volume 107a composed only of one RAID group 104a. The virtual volume 107a is provided to the hypervisor 24 from the storage controller 150a. A virtual volume 107b composed of the same RAID group 104a is managed by a storage controller 150b which differs from the currently used virtual volume 107a, and can be used if necessary.

Now, we will consider a case where the increase of amount of disk IO (Input/Output) processes requested by the instance 21b caused the drive use rate of the HDD 105a consisting the RAID group 104a to reach the performance limitation, and the IO performance has been deteriorated.

For example, regarding the above-mentioned performance deterioration, when the hypervisor 24 detects using its monitor function that the IO response time has exceeded a threshold set in advance, there is a high possibility that the performance of the path 301 is determined as deteriorated. In that case, the hypervisor 24 migrates the virtual disk 102b of the instance 21b to a different virtual volume 107b so as to prevent any influence to the performance of the instance 21a arranged in the same virtual volume 107a (migration operation 306).

However, since the virtual volume 107b as migration destination is composed of the same RAID group 104a as the migration source virtual volume 107a, the IO will be issued to the physically same HDD 105a before and after migration. In that case, the performance bottleneck factor is not resolved even if the instance 21b uses the migration destination virtual disk 102c by a volume that differs from the migration source volume, so as a result, the performance deterioration cannot be prevented.

Further, as an internal process of the migration operation 306, a process is performed to copy the virtual disk 102b to a different volume via the hypervisor 24, so that the migration operation 306 itself consumes the resources of the virtual machine host 20 and the storage system 100. At this time, not only the IO processing performance of the instance 21b but also that of the instance 21a will be influenced. Further, since the storage controller 150 passed via the process differs before and after migration, in the worst case, the cache hit rate in the storage controller is deteriorated, and the IO response may be deteriorated.

The above example has the following two drawbacks: (1) the items being monitored for detecting the deterioration of performance is not appropriate, and determination is performed based on a secondary phenomenon that differs from the true factor of bottleneck; and (2) the consumption of resources of the configuration change means itself is not considered, and the main operation process is influenced thereby.

Therefore, the present invention approaches the above-mentioned drawbacks in the following manner.

Regarding (1), the true factor of bottleneck is specified by collecting not only the performance information of the virtual machine host 20 but also the performance information of other devices such as the storage system 100 and the FC-SW 50 in the SAN, and integrally analyzing the information. At this time, the confliction of the requests for resources is determined by focusing on the components shared by two instances, such as the hypervisor 24 and the RAID group 104a.

This is because the range in which the performance is influenced is determined by whether physically independent resources are shared or not, since the physical servers according to the present embodiment are composed of two types of servers, which are the bare metal host 10 and the virtual machine host 20. For example, in the case of the virtual machine host 20, the influence of the instance 21 sharing the same physical server 20 must be considered, but as for the instance 11 in the bare metal host 10, it can be considered that the server resource is not influenced by any other instances. This share/non-share relationship can be applied not only to the physical server but to other types of resources, such as a network switch or a storage system, and it can also be applied to a configuration such as a CPU core where independent components are disposed within the same system.

Furthermore, depending on the application 22 operating in the instance 21, the resource type likely to have increased processing requests may differ. This is because depending on the application, the necessary resources are not fixed, and the properties related to use of resources may differ. For example, if the application requires a large amount of data IO, such as in a database, the storage performance and the loaded memory capacity is required, and if the application relates to a full-text search server, the CPU performance necessary to perform processes to calculate the hash value and the index is required. Therefore, an analyzing method is required that considers the shared and non-shared relationship of resources by instances, and also considers the characteristics of the tendency of use of resources according to the application.

Regarding (2), the tendency of use of resources required by the instance 21 and the tendency of the requests to resources that the configuration change means itself has are added to the consideration. Further, the method for solving one type of performance deterioration is not limited to one. For example, in order to solve the tightening of performance of the RAID group 104a, a method of increasing the number of HDDs 105a constituting the RAID group 104a, a method of adding the volume 101b composed in a different RAID group 104b to the storage pool 106, or a method of increasing the amount of cache of the storage controller 150a and reducing the number of times of IO to the HDD 105a, are effective. Further, considering the point that the configuration change is performed in parallel with other operations, it is most preferable to select a means for changing configuration having a smallest competition of resource requests with other operations.

Therefore, the present invention provides a means for adjusting the timing for performing the configuration change by selecting an appropriate configuration means so that there are no competitions in the requests to a specific resource, by considering the shared/non-shared relationship between the resources requested by the main business application and the resources requested by the configuration change means.

The above-described management method will be described, together with the following functions realized by the management computer 200.

Figure 5:
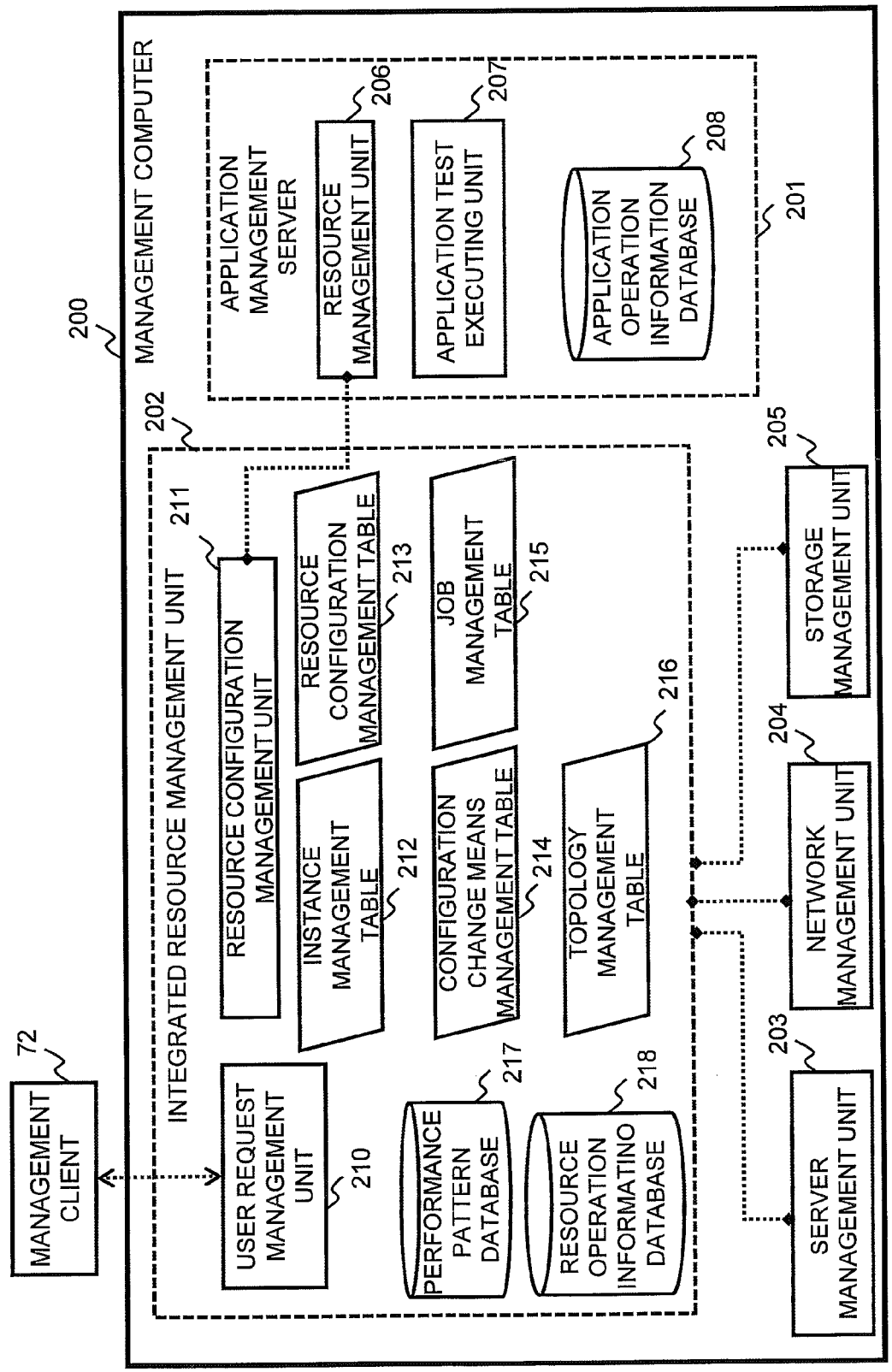
FIG. 5 is an internal configuration diagram of a management computer according to the present embodiment.

FIG. 5 is an internal configuration diagram of the management computer 200. The application management server 201 mainly comprises a resource management unit 206 for mainly controlling the configuration of the guest OS 13 and 23 in the instances 11 and 21, an application operation information database 208 for accumulating the status of use of the respective virtual resources related to the application, and an application test execution unit 207 for automatically executing or supporting the test operation of the application, and controls the setting of the applications 12 and 22 managed thereby.

The integrated resource management unit 202 includes a user request management unit 210 for managing requests from the management client 72 and sending a response thereto, and a resource configuration management unit 211 for cooperating with the respective device management units 203, 204, 205 and the application management server 201 to control the overall configuration of the computer system.

The resource configuration management unit 211 executes processes according to the requests from the user request management unit 210, the notification from the respective device management units 203, 204 and 205, or based on a planned schedule. At that time, the resource configuration management unit 211 refers to an instance management table 212 managing the configuration of instances, a resource configuration management table 213 having gathered the configuration information that the respective device management units have, a configuration change means management table 214 defining the configuration change means based on the functions of the respective device management units 203, 204 and 205, a job management table 215 managing the execution status of jobs executed by the management computer 200, a topology management table 216 managing the shared/non-shared statuses of resources, a performance pattern database 217 for storing the characteristic quantity related to the performance information regarding the respective resources, and a resource operation information database 218 for accumulating the performance information of the respective devices operating in the computer system.

The instance management table 212 shown in FIG. 6 retains management information related to the configuration of the instances 11 and 21. When the user performs operations such as creation and deletion of instances or configuration change using the management client 72, the integrated resource management unit 202 transmits and receives the management information by the user request management unit 210, and retains the same in the instance management table 212.

In the present embodiment, the physical resources allocated to instances are divided into groups called resource pools, and the capacity and number of resources are managed thereby. The instance management table 212 retains at least an identifier 212a of instances, a virtual resource configuration 212d and a resource pool 212c which is a source of allocation of instances.

Further, as for the information for managing the status of use of the respective instances as IaaS cloud, it is possible to retain information such as an owner 212b indicating the user having the authority to perform configuration change of the instance, the consumption point 212g caused by the use of the instance, and due date of use 212h.

In addition, items such as a network policy 212e, a grade 212f for defining the service level and an application management server 212j can be further retained as management information related to the virtual resource configuration 212d.

The resource configuration management table 213 illustrated in FIG. 7 retains a physical resource belonging to a resource pool 213a and access rights thereof. Here, a physical resource refers to a set of a physical server 213c, an Ether switch 213d, an FC switch 213e and a storage subsystem 213f managed by the respective device management units.

The configuration change means management table 214 illustrated in FIG. 8 retains a configuration change means 214b having combined the respective device management units and the configuration management function provided by the application management server 201. A unique identifier 214a is assigned to each configuration change means 214b, which is managed together with a performance deterioration factor 214c. Further, the respective configuration change means 214b is composed of one or more execution steps 214e, and each execution step 214e has assigned thereto a unique serial number within each configuration change means in step ID 214d. The present execution steps 214e are realized by the configuration management function provided by the respective device management units and the application management server 201. Further, it retains a request destination 214h indicating to which management unit the order related to the configuration change that the present execution step 214e has is transmitted. Especially, by combining multiple execution steps, it becomes possible to realize a means for solving the performance bottleneck which is not simply caused by a single resource type.

The logical entity of the execution steps 214e can be in the form of a program (such as an object or a binary) or in the form of a script, as long as it can be interpreted in the respective request destinations 214h. However, the execution steps 214e of the respective records can be values such as paths and identifiers in a file system capable of reaching the entity, instead of having the entity of the program or the script itself stored directly thereto. In order to refer to a performance pattern required for the respective execution steps of the configuration change means 214b, a pair of performance pattern acquisition keys 214j are retained in the record. This performance pattern is created by a test performed in advance in the system configuration, or by referring to past histories, and are retained in the performance pattern database 217. Further, if there is a need to determine whether execution of the respective steps 214e are possible or whether the steps have succeeded or not, a precondition 214f and a postcondition 214g are retained using referable parameters in the relevant execution steps 214e.

The job management table 215 shown in FIG. 9 collectively retains configuration management jobs executed by the respective management programs. This table 215 retains a unique identifier 215a with respect to a job 215b, a job issue target 215c and a start time 215d, and thereby, it becomes possible to comprehend the generation status of the respective configuration management jobs that the management computer 200 performs to the respective devices.

The topology management table 216 illustrated in FIG. 10 retains configuration information for physically identifying resources allocated to each instance 216a. As the configuration information, a physical server 216c, an Ether switch 216d, an FC switch 216e and a storage subsystem 216f, which are components of the system illustrated in FIGS. 1 through 3, are retained to identify the elements of the logical resources, and further, a resource pool 216b for associating the information with the resource configuration management table 213 (FIG. 7) is also retained.

In further detail, for example, the physical server 216c is a unique identifier (ID) and the allocated CPU core, and the FC switch 216e is the port number in the switch being used. These records are a collection of information collected from the respective device management units, and since the form of expression differs per management unit of each device, they are subjected to name collation before being recorded. The table 216 is updated either periodically in a sufficiently short time width, or when a configuration change order is received from the respective device management units, so that the change of configuration of resources caused in the respective devices can be followed.

As mentioned earlier, the important process being the characteristic feature of the present invention is a process for comprehending the shared/non-shared relationship of the respective resources. When a performance deterioration tendency is detected regarding the instance for operating a certain application is detected, or when a configuration change is performed, this shared/non-shared relationship should be checked to determine the influence range thereof.

Whether a shared relationship exists or not by focusing on a certain resource is provided by the operation of the topology management table 216. The topology management table 216 of FIG. 10 lists resources used for each instance, and the resources that are overlapped when searching in the vertical direction are the shared resources. For example, by focusing on the physical server 216c, the CPU core of the first record (Core 0-7) includes the CPU core of the second record (Core 3-4), so that in core numbers 3 and 4, the CPU process requests issued respectively from instances IST-A0-0001 and IST-A0-0003 may compete. Further, by focusing on the storage subsystem 216f, since the first to third records share the same RAID group, it can be seen that the tightening of the drive use rate influences these instances.

According to the system configuration of FIG. 1, even in a same physical server, the shared/non-shared relationship differs dynamically, such as the bare metal host 10 and the virtual machine host 20 being switched by the introduction and deletion of the hypervisor. Especially, in a large-scale environment, it is considered that configuration change operations realized by the software occur frequently, so that the topology management table 216 is updated when the configuration change operation is performed.

As mentioned earlier, the load that is generated in the respective resources tends to be constant according to the classification of the respective devices constituting the system or the classification of the application being operated. One of the characteristics of the present invention is that the property of the request performance that occurs per application to resources is managed as a performance pattern, to provide a method for specifying the bottleneck factor.

In the present embodiment, the values acquired and processed by the respective management programs in the management computer 200, which are indexes representing one or more resource performances (workloads such as use rate, response time and throughput) in the respective hardware constituting the system, are called "performance information", "performance value", or if they are not required to be distinguished, simply referred to as "performance". According to the present invention, the "performance pattern" refers to the typical characteristic quantities extracted based on the performance information and the performance information itself. The characteristic quantities extracted based on the performance information refers for example to the timings of specific fluctuations of multiple performance information, the difference and scaling factor related to a threshold value set in advance, and a value related to bottleneck being the factor of fluctuation of these performance information.

In the present embodiment, a performance pattern where the bottleneck factor is already known (model pattern) is prepared, and the performance pattern having the highest degree of similarity with the predicted value and the history of the performance information is specified, to thereby specify the bottleneck factor of performance with respect to the history and predicted value of the target performance information.

Figure 11:
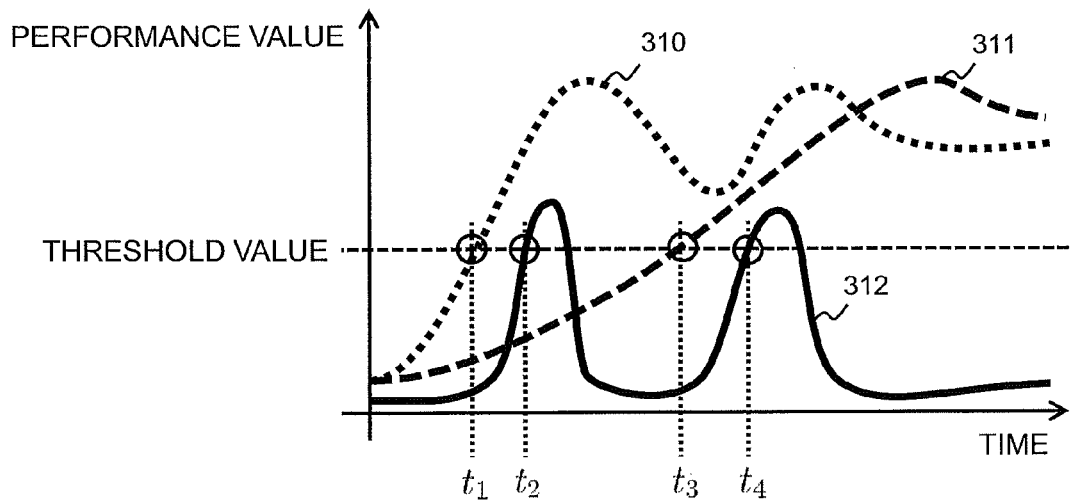
FIG. 11 is a conceptual diagram according to an evaluation of performance characteristics according to the present embodiment.

FIG. 11 is a conceptual diagram related to the evaluation of the performance characteristics mentioned earlier. In FIG. 11, the performance value of the respective resource types are taken as the vertical axis with respect to the time as the horizontal axis to create a graph, wherein simultaneously, a threshold for determining the saturating of performance is indicated. However, regarding the respective performance values, the values normalized via a threshold are shown to facilitate comparison with the threshold value. Moreover, the respective performance values are restricted to those capable of being acquired via the performance monitor function of the respective management programs.

As shown in FIG. 11, the load caused by the processes requested by the application is not necessarily uniform, depending on the difference of architecture for each system configurations. For example, various different tendencies are caused, such as in the case of a characteristic curve 310 (dotted line) where there is a swing-back with respect to the point of variation as shown, the monotonic increase as shown by the characteristic curve 311 (dashed line), or the intermittent increase of values as shown in the characteristic curve 312 (solid line). Further, there are tendencies with a burst characteristics, or having a periodic fluctuation with respect to a fixed time interval.

Hereafter, the properties and characteristics of the performance information generated depending on the differences of applications and hardware are referred to as "performance tendencies". Therefore, as seen in prior art techniques, the method for determining the cause of deterioration of performance based simply on whether a certain threshold has been exceeded or not cannot sufficiently cope with the system composed of a large number of virtual resources and physical resources, which is the target of the present embodiment. One of the characteristic features of the management method provided by the present embodiment is that the performance tendencies of the respective resources are integrally comprehended and managed as performance patterns.

In FIG. 11, at a time t1 prior to a time t3 when a characteristic curve 311 of a resource being the true bottleneck factor exceeds a threshold, the characteristic curve 310 of a different resource has exceeded the threshold. Thereby, for example, even though the true bottleneck factor is the resource represented by the characteristic curve 311, if the system focuses on the fluctuation of the characteristic curve 31 of another resource, it will erroneously determine a resource that is not the true bottleneck factor as the bottleneck factor based on the material of determination that the curve has exceeded the threshold at time t1. One example corresponds to this case where, in the system configuration of FIG. 4, the bottleneck is determined based on a response performance in a path 301 monitored by the hypervisor 24, so that the performance deterioration of a drive 105a which is the true bottleneck factor cannot be detected.

If the resources differ, the device management units in charge thereof also differ, so that the threshold used for the determination is not the same even for the same performance deterioration. For example, if the server management unit 203 has set up a more severe threshold (threshold determining that there is a problem in performance to even a relatively smaller performance deterioration) than the network management unit 204 for the deterioration of performance in a specific network switch, the deterioration of performance of the network switch may be determined as the failure of the network interface in the server.

Therefore, in order to specify the true bottleneck, it is not only necessary to determine whether a threshold has been exceeded or not but to consider the level and timing of occurrence of performance fluctuations in the respective resources. This is because the resources influenced by the deterioration of performance in response to the bottleneck factor have causal relationships, and the order in which performance fluctuation occurs with respect to the same factor is fixed.

For example, in the case of a performance deterioration caused by the tightening of the CPU 151 in the storage system 100 illustrated in FIG. 3, the order can be assumed as follows: the dirty ratio of data in the cache 153 (ratio of data in a cache not written to a non-volatile memory) is increased in response to the deterioration of processing performance of the CPU 151, flow-in from the HBA 52 will be limited, and then the influence of deterioration of performance occurs to the server-side HBA 52. Taking the case of FIG. 11 as an example, it is necessary to evaluate the performance characteristics by taking into consideration the timing between time t1 when the characteristic curve 310 has exceeded the threshold and time t3 when the characteristic curve 311 has exceeded the threshold. Further, it is considered that this order does not depend on the time of occurrence, and that it is always the same with respect to a single factor.

In the present invention, a combination of performance information, such as the characteristic curve when the bottleneck factor is clear, is stored as a model pattern in the performance pattern database 217. The performance pattern database 217 retains a performance pattern including the relationship of timing in which the values exceed the threshold in a time series, at least using the combination of application and bottleneck factor as a key value. By comparing this performance pattern and the performance information of the system in operation accumulated in the resource operation information database 218, it becomes possible to extract the performance tendency to evaluate the level of closeness of the patterns as similarity, and to specify the bottleneck factor.

The calculation of similarity can be performed using two methods, a method for calculating the degree of correlation of both characteristic curves, and a method for comparing the frequency spectra calculated by via discrete Fourier transformation at a given time width, wherein the performance patterns having a small difference, that is, the patterns that are most approximated are selected. Further, it is possible to select the performance patterns by comparing the timing of the times where performance fluctuations occur, considering the causal relationship between the bottleneck factor and the order in which the performance of respective resources are influenced. Furthermore, since these performance patterns also depend on the differences in hardware constituting the system, the device being used is also retained, as shown in the resource configuration management table 213.

The operation for generating performance patterns is either based on a test in advance or a definition defined by an administrator. If the generation operation is executed in a system composed of hardware having the same specifications, it becomes possible to obtain a sample of performance information having a high accuracy with respect to the deterioration of performance that may actually occur. Therefore, the accuracy of the management method can be enhanced by performing the operation for generating performance patterns as a stress test in the same computer system, for example, or by introducing performance patterns in other systems having the same configuration. According to this method, the performance fluctuations in multiple resource types can be evaluated integrally without being biased to a specific performance information, and therefore, the accuracy of the analyzing function of specifying the bottleneck can be improved.

If there is sufficient correlation recognized between the characteristic quantity of the performance pattern and the ongoing performance information, performance prediction becomes possible using the performance pattern. For example, in FIG. 11, if the difference with the performance pattern is extremely small at time t2, if configuration change is not performed to the resource, the performance fluctuation after time t2 (future time) can be assumed to follow the performance pattern.

Figure 12:
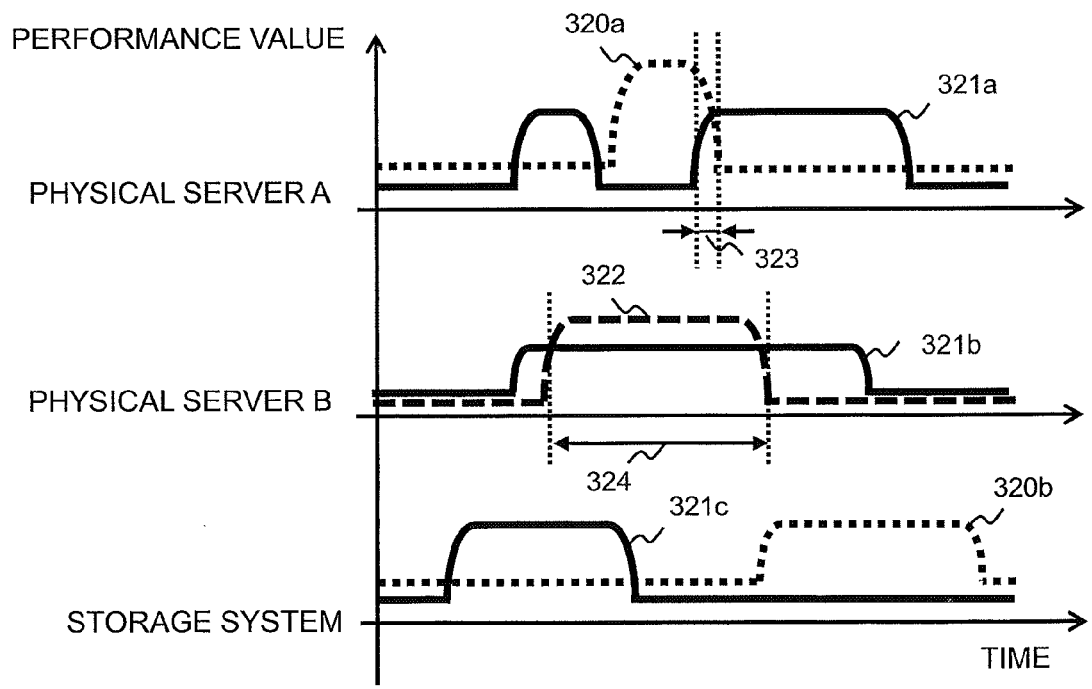
FIG. 12 is a conceptual diagram according to a method for selecting a configuration change means according to the present embodiment.

FIG. 12 is a conceptual diagram describing the method for selecting the configuration change means according to the present invention. If multiple configuration change means are considered regarding a single performance deterioration factor, it can be considered that the means hardly causing competition of resource requests is the more suitable configuration change means, so that in order to measure the aptitude of the configuration change means, the degree in which resource requests compete is numerically converted by clarifying the shared/non-shared relationship of the respective components of the resources. In the present embodiment, the amount of resources consumed by executing the configuration change means, or the degree in which the processing performance of other applications is suppressed in a resource having a shared relationship are referred to as "processing costs".

In FIG. 12, regarding the instance where performance deterioration has occurred, the physical servers A and B and the storage subsystem are in a non-shared relationship. At this time, time series graphs 321a, 321b and 321c of the history of performance information and the predicted value are calculated for each of the respective physical resources. At this time, regarding the respective physical resources, time series graphs 321a, 321b and 321c of the history of performance information and the predicted value are calculated. Further, not only the predicted value of performance by operation of the respective applications, but also the prediction of influence caused by the configuration change already planned by the management program must be added to the consideration. Therefore, whether a job planned by the respective management programs exists or not is confirmed by searching the job management table 215, and when a job is detected, it is included in the time series.

Here, when superiority and inferiority are evaluated for two certain configuration change means, graphs 320a, 320b and 322 of performance values acquired from the performance pattern database 217 are superposed to the graph of FIG. 12. At this time, it can be recognized that the existing instances and the two candidate configuration change means cause competition of resource requests at time width 323 and 324 where the time series graph of the history of performance information and predicted value thereof overlap with the present graph of the performance value. Therefore, it can be evaluated that the selection of a configuration change means that causes a smaller time width 323 is more appropriate since it has a smaller processing cost, so as to suppress the influence that the configuration change causes to the existing operations.

Further, if the performance information is expressed by the rate of use of the network bandwidth or time-sharing, the total amount of resources being consumed by the configuration change is a more appropriate index for measuring the level of influence, compared to the length of the time in which the performances are influenced. For example, in some cases, though it may take a long time, the configuration change means that can be executed by only consuming excessive resources may be more efficient compared to the configuration change means that consumes most resources of the shared section within a short time. It is possible to take such condition into consideration and to select a configuration change means by adding the level of the performance value or the integrated value of performance value at the above-described overlapped time.

Further, if the performance information is an IO response time and the like and a fixed threshold is set thereto, the superiority or inferiority can be evaluated by the ratio to the threshold, by normalizing the value by the threshold. Further, since it may be possible to reduce the processing cost by selecting a time band where the processing load of the application is small depending on the execution start time of the configuration change means, the waiting time for starting the same can be calculated within a fixed range.

Further, the performance values do not have to be absolute values (difference from zero in the relevant unit), but can use differences from a specific reference value. For example, if networks exist in a mixture where the upper limits of transfer bandwidths differ, the same amount of transfer caused by the configuration change means is considered to have a greater influence on the network having a narrower bandwidth, so that the degree of tightening of bandwidth is evaluated by obtaining a difference from the reference value set to the average use rate.

As described above, in order to evaluate the level of influence caused by the configuration change means of the present embodiment, it is important which performance information is selected as the target of comparison. According to the present embodiment, the performance information related to the respective devices and the processing costs of the configuration change means are all added together to evaluate the degree of influence by the configuration change means. In other words, even when there is a same tendency in multiple performance information, the degree of influence being added together is evaluated as having a greater influence than individual tendencies. Therefore, if performance information having a causal relationship, that is, information that have mutual influences, are adopted as the determination materials, the influence to performance may be unreasonably highly evaluated even if there is one influence factor.

According to the present embodiment, the shared/non-shared relationship is checked in advance using the topology management table 216, and the performance information of resources that do not have mutual dependent relationships are selected to evaluate the degree of influence of the configuration change means. For example, if the physical server A and physical server B are in a non-shared relationship, they are determined to not have mutual influence to performance, and the respective performance information can be evaluated fairly.

<Process Flow>

Figure 13:
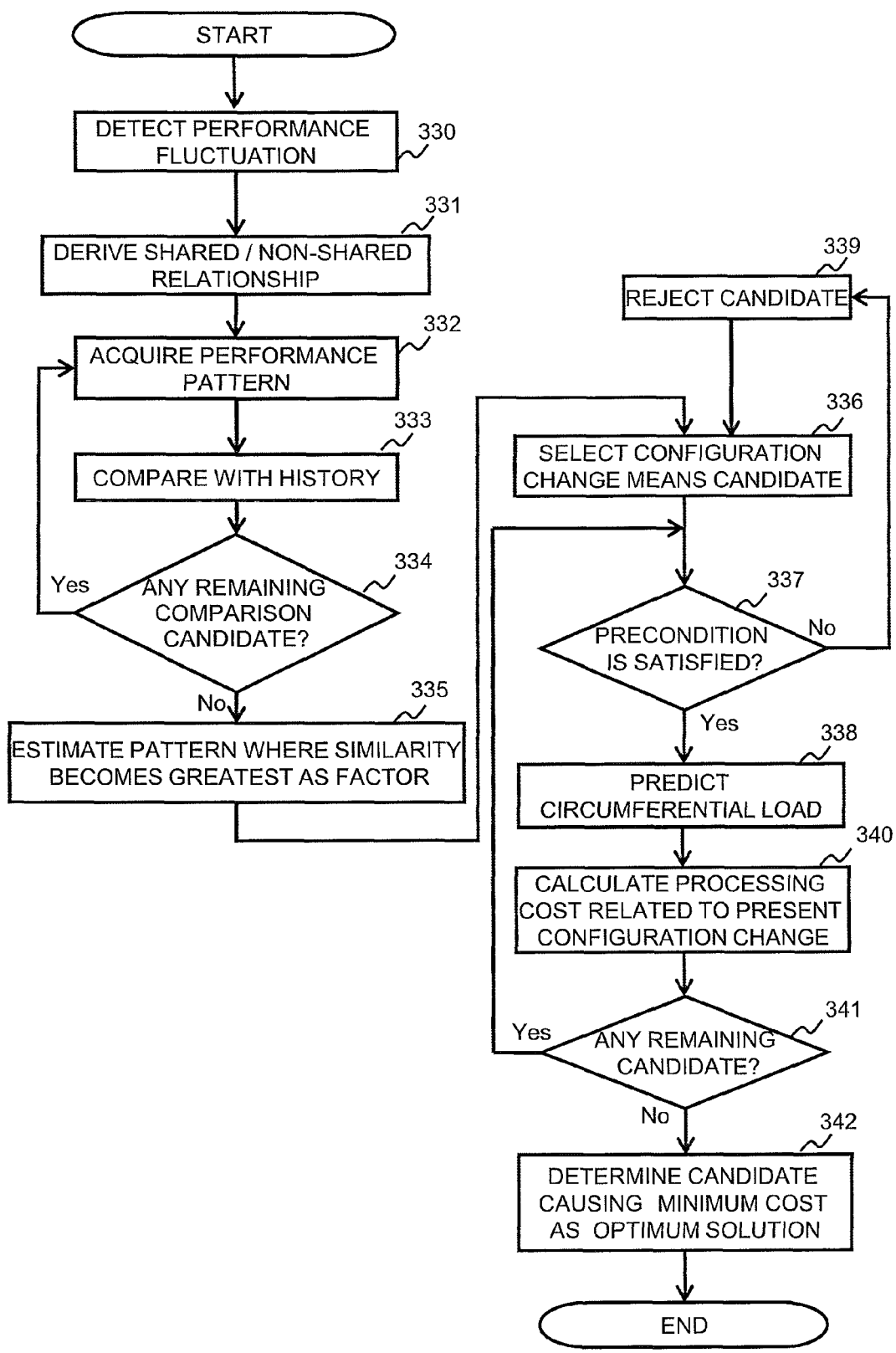
FIG. 13 is a view illustrating a processing flow according to the present embodiment.

FIG. 13 is a view showing a process flow from when the deterioration of performance has occurred to when the configuration change means is determined according to the present invention.

In step 330, the integrated resource management unit 202 detects the deterioration of performance caused by the fluctuation of performance of resources. The detection method can be a performance deterioration alarm issued by the respective device management units (the server management unit 203, the network management unit 204 and the storage management unit 205) or the application management server 201, or through periodic analysis of the performance information collected in the resource operation information database 218. The detection of performance deterioration by fluctuation is at least associated with the information regarding the resource being the component in which the fluctuation occurred.

In step 331, the resource configuration management unit 211 updates the topology management table 216, and then searches the data in the column direction of the topology management table 216 as mentioned earlier, and calculates the shared/unshared relationship. The column focused here includes at least a column related to the generation component (resource) detected in the previous step 330. As a result, the instance using the generation component (resource) and the instance sharing any of the resources with that instance are selected as comparison candidates. Further, the instances and resource that do not share all resource classifications with that instance are excluded from the evaluation target in the subsequent process flow.

In step 332, the resource configuration management unit 211 acquires a performance pattern searched from the performance pattern database 217 based on resources remaining as evaluation targets.

In step 333, the resource configuration management unit 211 compares the performance history (corresponding to the solid line graph showing the history of performance information illustrated in FIG. 12) and the performance pattern of the resource acquired in the previous step 332 (corresponding to the dotted line or dashed line graph showing the performance value in FIG. 12) are compared regarding the instance determined as the comparison candidate selected in the previous step 331, and the similarity is calculated. The comparison candidate whose similarly calculation has been completed is recognized as being already compared, and the procedure advances to the following step 334.

In step 334, the resource configuration management unit 211 confirms the progress of comparison, and if a comparison candidate whose similarity is not yet calculated remains (Yes), the procedure returns to step 332 and the evaluation is executed repeatedly. On the other hand, if similarity calculation has been completed for all comparison candidates (No), the procedure advances to the following step 335.

In step 335, the resource configuration management unit 211 extracts a performance pattern where the similarity becomes greatest from the performance pattern database 217, based on all comparison candidates and similarities. The performance pattern is stored in the performance pattern database 217 by being set with a performance deterioration factor in advance, so that according to the present step, the component being the bottleneck of performance can be estimated.

In step 336, the resource configuration management unit 211 searches the performance deterioration factor 214c of the configuration change means management table 214 based on the performance deterioration factor estimated in the previous step 335, and the corresponding configuration change means 214b is selected as the candidate.

In step 337, the resource configuration management unit 211 selects the not-yet-evaluated means from the configuration change means 214b selected as the candidate, and evaluates the precondition 214f. When the precondition 214f is satisfied (Yes), the procedure advances to the next step 338, but if it is not satisfied (No), the procedure advances to step 339 and the present candidate of configuration change means is rejected.

In step 338, the resource configuration management unit 211 refers to the topology management table 216, and searches the configuration change components regarding the present configuration change means candidate. This configuration change components are resources being the target of the configuration change means candidate and all instances sharing this resource. Further, as for the searched configuration change components, the performance information thereof are acquired from the resource operation information database 218, and the predicted values thereof are calculated based on the performance pattern database 217.

In step 340, the resource configuration management unit 211 calculates the processing costs using the predicted value of performance information of the configuration change components related to the configuration change means candidates calculated in step 338. Here, the processing costs are the degree of influence on performance caused by the performance of operation of the configuration change component and the process (operation) of the configuration change means itself occurring simultaneously. Most simply, for example, the processing costs can be evaluated by the length of a period of time in which the operations occur simultaneously. With reference to FIG. 12, the performance of the configuration change component at the time of operation corresponds to the solid line graph which is the time series graph of the history of performance information and the predicted value thereof in FIG. 12, and the process (operation) performed by the configuration change means itself corresponds to the dotted line or dashed line graph which is the time series graph of the performance value in FIG. 12. The overlapped portion corresponds to the period of time in which they are simultaneously in an operated state, and the shorter the period, the smaller the processing costs. Further, the processing costs can be evaluated by the size having integrated the respective performance values within the period of time in which they are simultaneously in an operated state. However, the method for calculating processing costs must be constant throughout the present flow, to fairly compare the multiple configuration change means candidates.

In step 341, the resource configuration management unit 211 confirms whether or not all the candidates selected in step 336 have been evaluated or not. If non-evaluated candidates remain (Yes), the procedure returns to step 337, and if evaluation of all candidates has been completed (No), then the procedure advances to the next step 342.

In step 342, the resource configuration management unit 211 determines the means having the minimum processing cost out of the configuration change means 214b remaining as the candidate as the most suitable configuration change means. However, in step 337, when all the configuration change means have been rejected, it is possible to conclude that there is no optimum configuration change means, or if the processing costs are similar among the respective configuration change means 214b, and it may be meaningless to strictly narrow the configuration change means to a single means, it is possible to select multiple configuration change means as the conclusion.

The present processing flow is a process for evaluating the instance that is currently operating in the computer system and causing performance problems, and the object of the flow is to find an optimum configuration change means. Therefore, it is possible to add a process to display the configuration change means determined in step 342 to an administrator using the management client 72, for example. Further, since a method for controlling the execution steps 214e of the respective configuration change means 214b is managed in a form capable of being interpreted by the respective management programs in the configuration change means management table 214, the method can be automatically executed after the optimum configuration change means is determined. In that case, the relevant configuration change means is registered in the job management table 215.

REFERENCE SIGNS LIST

10: Bare metal host, 11, 21: Instance, 12, 22: Application, 13, 23: OS, 20: Virtual machine host, 24: Hypervisor, 50: Fibre Channel switch (FC-SW), 60: Ethernet switch, 70: Client computer, 71: Service client, 72: Management client, 100: Storage subsystem, 101: Volume, 102: Virtual disk, 150: Storage controller, 200: Management computer, 201: Application management server, 202: Integrated resource management unit, 203: Server management unit, 204: Network management unit, 205: Storage management unit, 250: Service network, 251, 252: Management network.

The invention claimed is:

1. A resource management method targeting multiple instances having a logical server, the method comprising:
    retaining one or more performance patterns that include a characteristic quantity extracted from a performance information of the resource in association with a bottleneck factor;
    detecting deterioration of performance of one or more resources assigned to a first instance, where the one or more resources include a first virtual volume associated with the first instance;
    extracting the first instance sharing a particular resource exhibiting the performance deterioration;
    calculating a mutual similarity by comparing a performance tendency showing properties and characteristics of performance of the first instance and each of the one or more performance patterns;
    estimating a bottleneck factor for a particular performance pattern from the one or more performance patterns having a maximum mutual similarity;
    selecting an optimal candidate configuration from a plurality of potential configuration candidates based on the bottleneck factor, wherein each of the plurality of potential configuration candidates includes one or more candidate resources, and the one or more candidate resources include a second virtual volume; and
    automatically migrating the first virtual volume to the second virtual volume based on the optimal candidate configuration,
    wherein:
    one of the performance patterns is a characteristics of timing in which a threshold for determining deterioration of performance of the resource is exceeded in time series; and
    the similarity is calculated based on a correlation between one of the performance patterns and a time-series fluctuation of performance of at least one of the one or more resources of the first instance.

2. The resource management method according to claim 1, further comprising:
    calculating a processing cost based on a time series variation of performance information of the one or more candidate resources of each of the plurality of potential candidate configurations and all instances sharing the resource; and
    selecting the optimal candidate from the plurality of potential candidate configurations based on processing cost.

3. The resource management method according to claim 2, wherein
    the processing cost is either a period of time during which time series variations are at simultaneous operating statuses or a level of integrated value of both performance values of a period of time.

4. A resource management system comprising:
    a performance pattern database, wherein the performance pattern database includes one or more performance patterns and each performance pattern includes a characteristic quantity extracted from a performance information of the resource in association with a bottleneck factor;
    a resource configuration management unit configured to:
    detect deterioration of performance of one or more resources assigned to a first instance, where the one or more resources include a first virtual volume associated with the first instance, and
    extract the first instance of sharing a particular resource exhibiting the performance deterioration;
    a mutual similarity calculating unit configured to:
    calculate a mutual similarity by comparing a performance tendency showing properties and characteristics of performance of the first instance and each of the one or more performance patterns, and
    estimate a bottleneck factor for a particular performance pattern from the one or more performance patterns having a maximum mutual similarity; and
    an optimal candidate configuration implementation unit configured to:
    select an optimal candidate configuration from a plurality of potential configuration candidates based on the bottleneck factor, wherein each of the plurality of potential configuration candidates includes one or more candidate resources, and the one or more candidate resources include a second virtual volume; and
    automatically migrate the first virtual volume to the second virtual volume based on the optimal candidate configuration
    wherein:
    one of the performance patterns is a characteristics of timing in which a threshold for determining deterioration of performance of the resource is exceeded in time series; and the calculation of the similarity is based on an interrelationship between one of the performance patterns and a time-series fluctuation of performance of at least one of the one or more resources of the first instance.

5. The resource management system according to claim 4, wherein the resource configuration management unit further:

calculates a processing cost, based on a time series variation of performance information of the one or more candidate resources of each of the plurality of potential candidate configurations and all instances of sharing the resource;

and selects the optimal candidate from the plurality of potential candidate configurations based on the processing cost.

6. The resource management system according to claim 5, wherein the processing cost is either a period of time during which time series variations are at simultaneous operating statuses or a level of integrated value of both performance values of a period of time.

* * * * *